US008033526B2

(12) United States Patent
Molino

(10) Patent No.: US 8,033,526 B2
(45) Date of Patent: Oct. 11, 2011

(54) LAND CLEARING DEVICE

(76) Inventor: Vincent A. Molino, Harahan, LA (US)

( * ) Notice: Subject to any disclaimer, the term of this patent is extended or adjusted under 35 U.S.C. 154(b) by 190 days.

(21) Appl. No.: 12/590,127

(22) Filed: Nov. 3, 2009

(65) Prior Publication Data
US 2010/0123110 A1 May 20, 2010

Related U.S. Application Data

(60) Provisional application No. 61/193,215, filed on Nov. 6, 2008.

(51) Int. Cl.
*A01B 1/16* (2006.01)
(52) U.S. Cl. .......................... 254/132; 254/120; 254/131
(58) Field of Classification Search .................. 254/120, 254/131, 132
See application file for complete search history.

(56) References Cited

U.S. PATENT DOCUMENTS

| | | | |
|---|---|---|---|
| 2,882,941 A * | 4/1959 | Pope ................................ 83/743 |
| 4,067,369 A * | 1/1978 | Harmon ....................... 144/34.1 |
| 7,066,449 B1 | 6/2006 | Trefan et al. |
| 2009/0095375 A1 | 4/2009 | Little et al. |

* cited by examiner

*Primary Examiner* — Joseph J Hail
*Assistant Examiner* — Shantese McDonald
(74) *Attorney, Agent, or Firm* — Keaty Law Firm

(57) ABSTRACT

A land clearing device that is sized and configured to be attached to a small earth moving machine, such as a skid loader. The land clearing device has a pusher assembly with telescopically extendable actuator arms that are operated by a control unit accessible from the interior of the earthmoving machine. When the actuator arms are extended, the forward end of the pusher assembly applies lateral force on a trunk of a tree, pushing the tree until uprooted. The pusher assembly is supported by a pair of upright legs that rest on the ground and provide stability to the pusher assembly, which cantilevered from the upright legs. A Y-shaped grabber assembly has a front hook that partially encircles and holds the tree below the location of contact with the pusher assembly. A mounting assembly is secured to the pusher assembly and the grabber assembly by a common securing rod about which the pusher assembly and the grabber assembly can pivot. The mounting assembly is configured for detachable mounting on a front of an earthmoving machine.

21 Claims, 4 Drawing Sheets

LAND CLEARING DEVICE

CROSS-REFERENCE TO RELATED APPLICATIONS

This application is a non-provisional application based on my provisional application, Ser. No. 61/193,215 filed Nov. 6, 2008 entitled A Land Clearing Device, the full disclosure of which is incorporated by reference herein and priority of which is hereby claimed.

BACKGROUND OF THE INVENTION

The present invention relates to tree and stump removal, and more particularly to a land clearing device used as an attachment for a skid steer loader or other earthmoving machine that can be used for removing trees and stumps.

It is expensive to use bulldozers and excavators to clear land for new construction of homes or just removing unwanted trees and stumps. It also requires a tremendous force to remove the trees and uproot the stumps. Usually, it is hoped to spare neighboring trees due to their beauty and expense to replace them. However, this has not always been possible when a building contractor or professional has used the expensive large, heave-duty bulldozers and excavators to clear the land and remove trees and stumps. These large, heavy-duty bulldozers and excavators, just because of their size, have frequently knocked down many of the neighboring trees that should have been saved. Additionally, there are swampy areas that require removal of trees and stumps, but this heavy-duty equipment sinks in the mud, causing further damage and expense. Thus, a land clearing device solving the aforementioned problem is desired.

SUMMARY OF THE INVENTION

It is therefore an object of the present invention to provide a tree felling device that can be secured to a small earth-moving machine.

It is another object of the invention to provide a tree felling attachment to an earth-moving machine that reduces the force required to uproot a tree.

These and other objects of the invention are achieved through a provision of a land clearing device that is sized and configured to be attached to a small earth moving machine.

The land clearing device comprises a pusher assembly having telescopically extendable actuator arms and a forward end configured to apply lateral pushing force to a trunk of a tree. The pusher assembly is supported by a pair of upright legs, said upright legs being configured to rest on the ground during operation of the land clearing device and being configured to support cantilevered pusher assembly forwardly from the earthmoving machine.

A grabber assembly is mounted below the pusher assembly; the grabber assembly has a Y-shaped yoke and a generally J-shaped front hook configured to partially encircle the trunk of the tree and support the tree at a location opposite a place of contact of the pusher arms. A mounting assembly is secured to the pusher assembly and the grabber assembly by a common securing rod about which the pusher assembly and the grabber assembly can pivot. The mounting assembly is configured for detachable mounting on a front of an earth-moving machine.

A control unit is provided for operating the pusher arms from interior of the earthmoving machine. The control unit can be a hydraulic control unit, and the actuator arms can be hydraulically operated pistons. The pusher assembly comprises a pair of tubular front pusher arms each configured to telescopically receive an actuator arm therein and a pair of tubular rear pusher arms configured to telescopically engage the front pusher arms.

These and other features of the present invention will become readily apparent upon further review of the following specification and drawings.

BRIEF DESCRIPTION OF THE DRAWINGS

Reference will now be made to the drawings, wherein like parts are designated by like numerals, and wherein.

Similar referenced characters denote corresponding features consistently throughout the attached drawings.

DETAIL DESCRIPTION OF THE INVENTION

As shown in FIGS. 1-4, the land clearing device 100 is sized and configured to be attached to a small earth-moving machine, for instance a skid steer loader or other similar equipment. Such earthmoving machines, including the skid loaders, are currently manufactured by Caterpillar, Bobcat, New Holland, Posi-Trac, Case, JCR, Scat-Trac, Kubota, Gehl, SDK, John Deere and other companies. In fact, these machines have become very popular in the past ten years, and many contractors currently own either multi-terrain or loader, such as the machine 120. Such machines are also available for rental.

Figure 1:
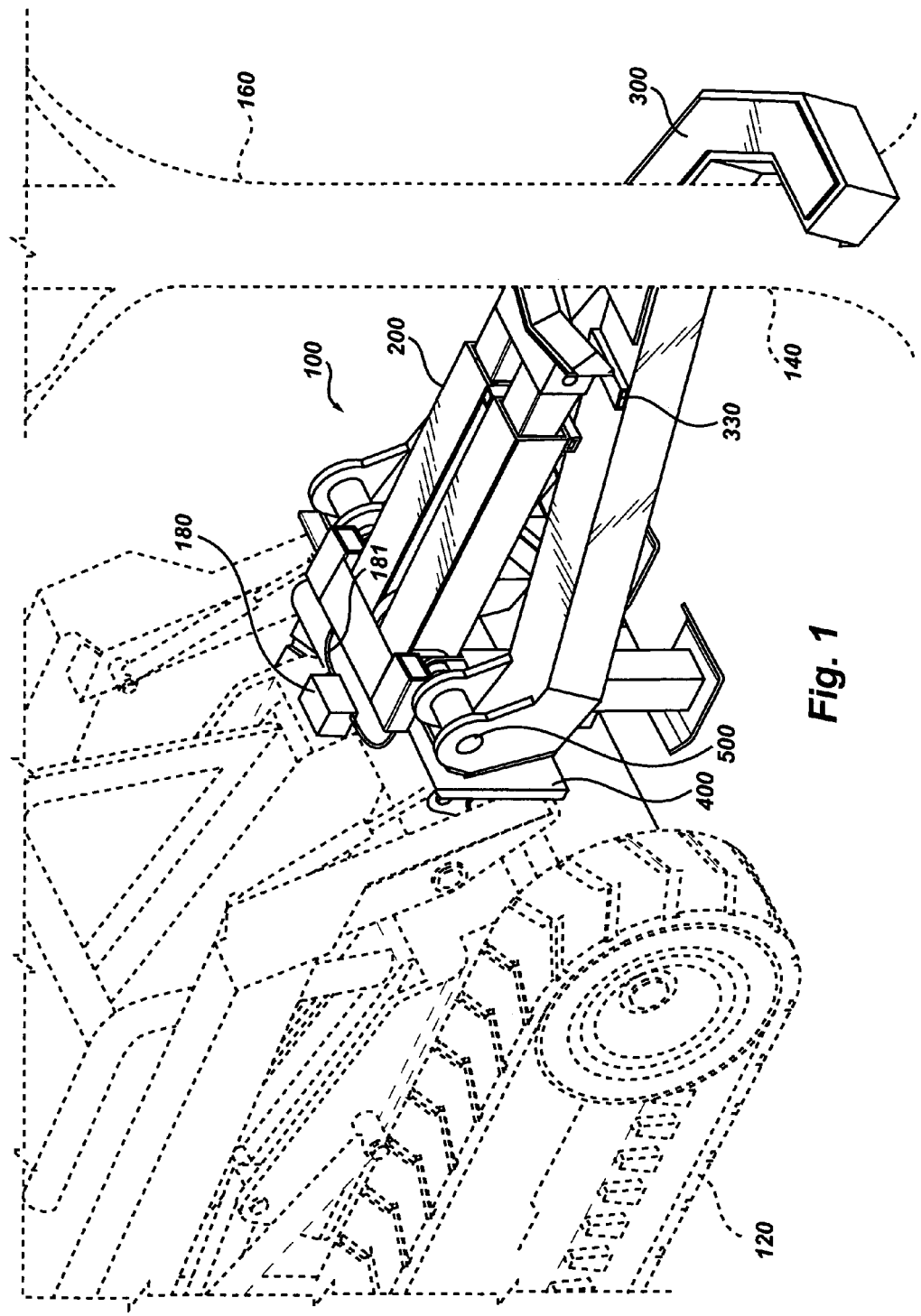
FIG. 1 is a perspective view of a land clearing device according to the present invention attached to a skid steer loader.

The land clearing device 100 comprises a pusher assembly 200 and a grabber assembly 300. As shown in FIG. 1, the machine or loader 120 with the land clearing deice 100 is brought near a trunk 140 of a tree, generally indicated with the number 160. The pusher assembly 200 and the grabber assembly 300 make contact with the tree 160 and snap the tree 160 near the trunk 140. The device 100 further comprises a universal mount assembly 400 that provides a means for securing the land clearing device 100 to the earthmoving machine 120. The mount assembly 400 is sized and configured for attachment to a variety of skid loaders, front loaders and the like.

A securing rod 500 extends through each of the three major components of the land clearing device 100 and facilitates the movement of the pusher assembly 200, the grabber assembly 300 and the mount assembly 400. Additionally, a control unit 180 that is operationally connected to the operating parts of the machine 120 permits control of hydraulics in the device 100 from the interior of the machine or loader 120.

Figure 2:
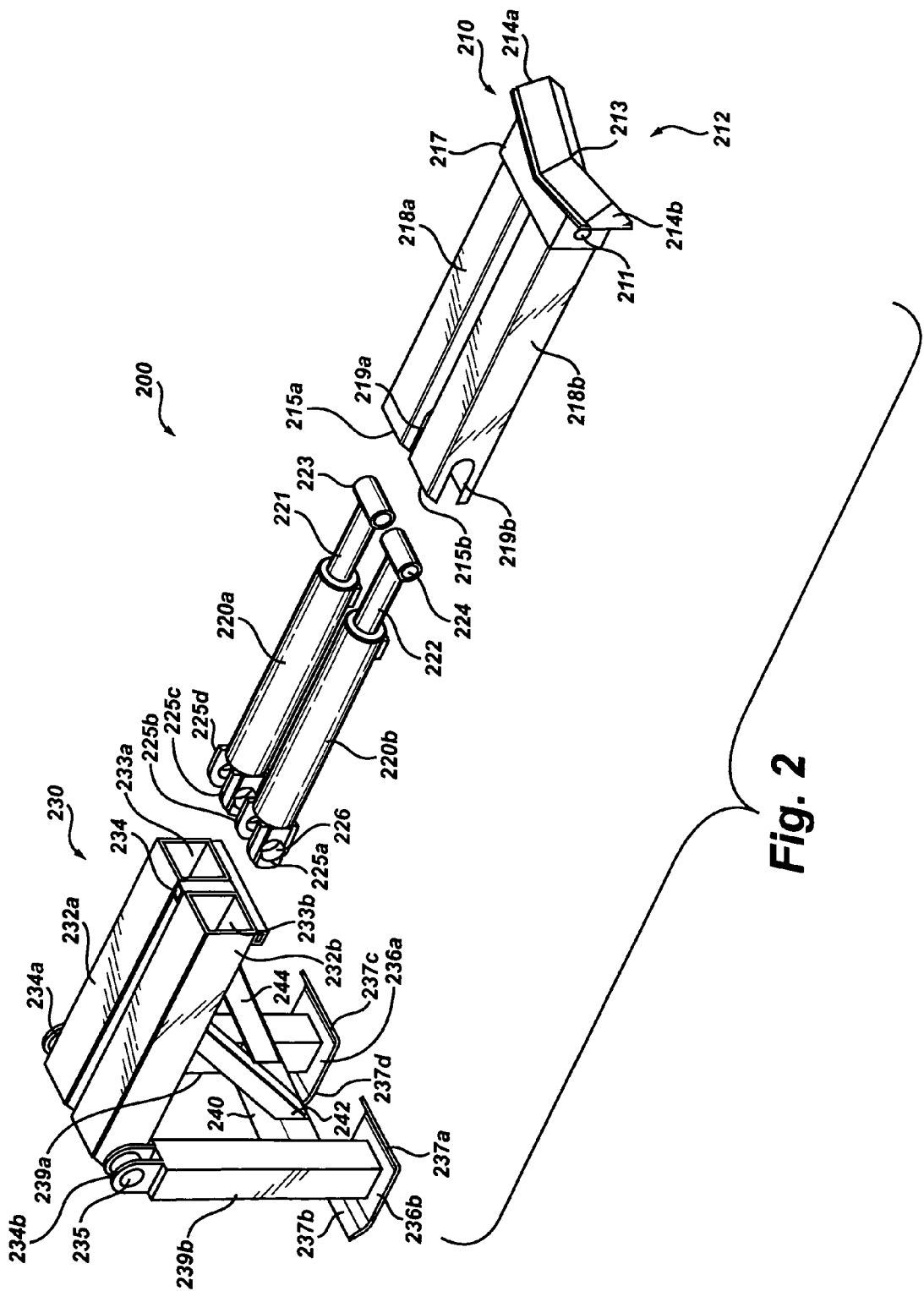
FIG. 2 is a partially exploded view of a pusher assembly of the land clearing device according to the present invention.

FIG. 2 is an exploded view of the pusher assembly 200 for the land clearing device 100 according to the present invention. The pusher assembly 200 is mostly made of tubular steel and flat bar to minimize cost. The pusher assembly 200 comprises an elongated assembly with a longitudinal axis extending from the proximate to distal ends thereof. The pusher assembly comprises a distal or forward portion 210, a middle portion 220, and a proximate or rear portion 230.

The forward portion 210 comprises a generally U-shaped contact member 212 which is formed with a center part 216 and a pair of side parts 214a and 214b unitary connected to the opposite ends of the center part 216. Each of the side parts 214a and 214b extends at an obtuse angle in relation to the center part 216 to form a trunk-contacting member of the pusher assembly 200. In one aspect of the invention, the side parts 214a and 214b each have a triangular configuration and are formed as solid bodies.

The contact member 210 is supported by a pair of elongated parallel front arms 218a and 218b. The front arms 218a and 218b can be formed as hollow tubular bodies having circular or rectangular cross-section. A front connecting member 217 secures the front arms 218a and 218b together, while retaining the front arms 218a and 218b in a spaced parallel relationship to each other. The front connecting member 217 comprises a U-shaped plate that has a top portion extending over the upper surfaces of the front arms 218a, b and downwardly depending portions that extend at a right angle to the top portion.

An opening 211 is formed in each of the downwardly depending portions of the front connecting member 217 (only one opening 211 is shown in FIG. 2). A corresponding pair of openings is formed in the front arms 218a, b for alignment with the openings 211. The openings 211 and correspondingly aligned openings in the front arms 218a and 218b are configured to receive cross pins of sliding rods 221, 222, as will be described in more detail hereinafter. The front connecting member 217 carries the contact member 212 such that the contact member 212 extends forwardly of the front arms 218a, 218b.

Distal ends 215a and 215b of the front arms 218a and 218b, respectively, are open. A U-shaped cutout 219a is formed in the distal end 215a, and a similar cutout 219b is formed in the distal end 21b5 of the front arm 218b.

The middle portion of the pusher assembly comprises a pair of spaced parallel actuator arms 220a and 220b. The actuators 220a and 220b are hydraulically powered cylinders with telescopically movable rods 221 and 222, respectively. The rods 221 and 222 are configured to move within the hydraulic cylinders 220a and 220b in response to a signal sent by an operator to the control unit 180 from the cabin of the loader 120. Free ends of the sliding rods 221, 222 each carry a cross pin 223, 224, respectively. The cross pins 223 and 224 are secured transversely to longitudinal axes of the sliding rods 221, 222.

The actuator arm 220a is sized and shaped to fit within the hollow front arm 218, and the actuator cylinder 220b is sized and configured to fit within the hollow front arm 218b. When the actuator arms 220a and 220b are positioned inside the front arms 218a and 218b, respectively, the cross pins 223 and 224 extend through the openings formed in the front arms and the openings 211. In this manner, lateral force is transmitted from the sliding rods 221, 222 to the front portion 210.

Proximate ends of the actuator arms 220a and 220b are each provided with a pair of spaced-apart attachment brackets designated by numerals 225a, 225b and 225c, 225d. Each of the attachment brackets 225a, 225b and 225c, 225d has a through opening 226 positioned in alignment with the other openings 226. When the actuator arms 220a and 220b are positioned inside the front arms 218a and 218b the openings 226 are aligned with the U-shaped cutouts 219a and 219b formed in the proximate ends of the hollow front arms 218a and 218b. A securing rod 500 is configured to extend through the aligned openings 225a, b, c, d and the cutouts 219a, b when the pusher assembly is mounted on the machine 120.

The proximate or rear portion 230 of the pusher assembly 200 comprises a pair of elongated spaced-apart parallel hollow tubular rear arms 232a and 232b. In one aspect, the rear arms may be circular or rectangular in cross section. Each of the two hollow rear arms 232a, 232b has a through opening 233a, 233b for receiving one of the pair of the front arms 218a and 218b, respectively, in a telescoping relationship.

A rear connecting member 234 is fitted between the rear arms 232a and 232b. The rear connecting member has an inverted T-shaped configuration, with the vertical part fitted between the rear arms 232a, 232b and the cross part extending under the bottom surfaces of the rear arms 232a and 232b. The rear connecting member 234 rigidly secures the rear arms 232a and 232b to cause the rear arms 232a and 232b in unison.

Each of the rear arms 232a and 232b is supported by an upright leg 239a, 239b, respectively. Each leg 239a, 239b has a base 236a, 236b that is adapted to rest on the ground, as shown in FIG. 1, during operation of the land clearing device 100. In one aspect of the invention, the base 236a is generally rectangular plate with upwardly extending front and rear lips 237c and 237d. The base 236b is a generally rectangular plate with upwardly extending front and rear lips 237a and 237b. The bases 236a, 236b provide support for the land clearing device 100 and slide along the ground when the land clearing device 100 moves. Additionally, because of the upwardly raised front and rear lips 237a, 237b and 237c, 237d, as well as the wide base, the land clearing device 100 can operate in swampy areas.

A securing bracket 234a and 234b is attached to the upper portions of the upright legs 239a, 239b, respectively. The securing brackets 234a and 234b each have an opening 235 (only one opening can be seen in FIG. 2) for receiving the common pivot rod or common securing rod 500 during operation of the land clearing device 100.

A lateral connecting brace 240 is secured between the upright legs 239a and 239b to ensure spaced-apart relationship between the legs. An angular brace 242 extends from the lateral brace 240 to an underside of the rear arm 232b, and a second lateral brace 244 extends from the lateral brace 240 to the underside of the rear arm 232a. The angular braces 242 and 244 extend at different angles in relation to their respective rear arms to accommodate the structure of the yoke booms 312 and 314. The angular braces 242, 244 facilitate stabilization of the rear arms, front arms and the actuating cylinders cantilevered from the upright legs 239a and 239b.

Figure 3:
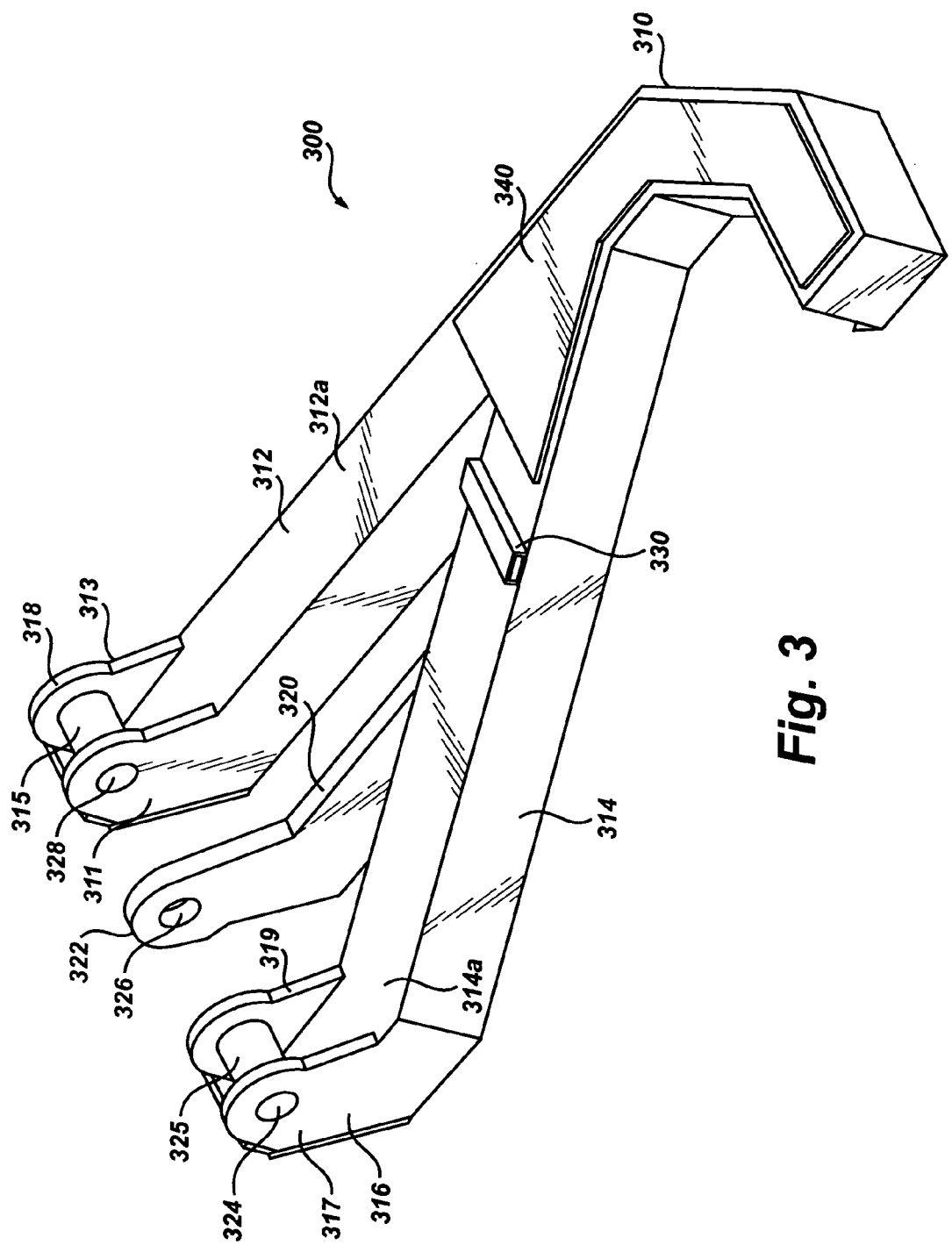
FIG. 3 is a perspective view of a grabber assembly of the land clearing device according to the present invention.

Turning now to FIG. 3, the grabber assembly 300 will be described in more detail. As can be seen in the drawings, the grabber assembly 300 comprises a forward portion or front hook 310 which is generally shaped as a J-shaped hook, and a back portion having a generally Y-shaped configuration. The J-shaped front hook is configured to partially encircle the trunk 140 of the tree 160 and support the tree on a side opposite the arms of the pusher assembly.

In one aspect, the forward portion 310 and the booms 312, 314 can be circular, squire or rectangular in cross-section. The embodiment illustrated in FIG. 3 shows the booms and the front portion made of tubular body. In one of the preferred embodiments, the front portion 310 and the booms 312, 314 are made of 0.25 tubular steel and many of the parts are made from eight-inch tubular steel (0.5 inch thick).

The back portion of the grabber assembly 300 comprises a pair of elongated booms 312, 314 which converge adjacent a line of connection of the back portion with the forward portion 310. In one aspect, the first boom 312 extends unitary in relation to the front portion 310, whereas the second boom 314 extends at an acute angle of approximately thirty degrees in relation to a longitudinal axis of the first boom 312, so as to form the Y-shaped back portion or yoke.

A rigidifying plate 340 is secured to the top surfaces of the front hook 310 and the area of intersection of the booms 312, 314 with the J-shaped front hook 310. The plate 340 reinforces the attachment of the second boom 314 to the first boom 312 and the front hook 310. A forward movement limiting member, or stop plate 330 is secured to a top plate 314a; the stop plate 330 provides a locking feature when the pusher assembly 200 rests on top of the grabber assembly 300.

Each of the booms 312 and 314 comprises an upwardly turned proximate ends 318 and 316 respectively. If the grabber assembly is formed from a square tubular stock, the top surfaces of the booms 312, 314 are bent upwardly to form the proximate ends 316 and 318. A pair of angular plates 317, 319 is secured to opposite sides of the top plate 314a of the second boom 314. A tubular connecting member 325 extends between the plates 317, 319 in alignment with openings 324 formed in the plates 317, 319.

The first boom 312 similarly has a top plate 312a that is bent upwardly near the proximate end 318. A pair of angular plates 311, 313 is fixedly attached on opposite sides of the top plate 312a. A tubular connecting member 315 is secured between the plates 311, 313 in alignment with openings 328 formed in the plates 311, 313.

A locking arm 320 is secured between the first boom 312 and the second boom 314. The locking arm 320 has a similarly upwardly tuned portion 322 which extends in general alignment with the proximate portions 316 and 318 of the booms 314, 312, respectively. An opening 326 is formed in the proximate portion 322 of the locking arm 320. When the grabber assembly is secured together, the rod 500 extends through the aligned openings 324, 326, and 328.

Figure 4:
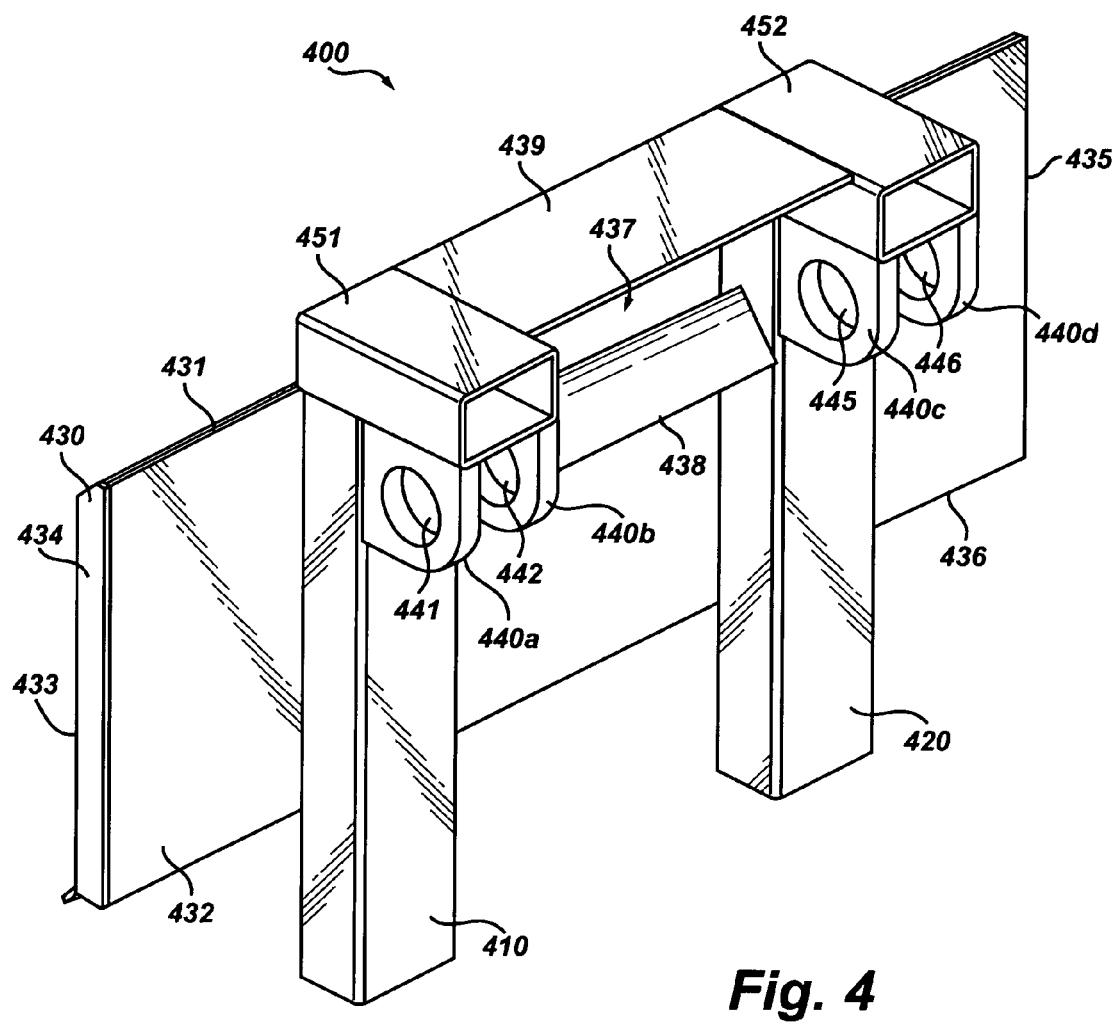
FIG. 4 is a perspective view of a universal mount of the land clearing device according to the present invention.

FIG. 4 illustrates the universal mount assembly 400 of the landing clearing device 100 according to the present invention. Different types of mounts can be manufactured to fit any construction vehicle unless it is manufactured with the land clearing device 100 permanently mounted thereon. In the embodiment illustrated in FIG. 4, the universal mount assembly 400 comprises two elongated upright mount legs 410, 420, which can be made as hollow bodies having a rectangular cross-section. The distance between the mount legs 410 and 420 is selected to be at least slightly greater than the width of the rear portion of the pusher assembly, so that the mount legs 410, 420 are fitted on opposite outer sides of the upright legs 239a and 239b, as shown in FIG. 1.

The backs of the mount legs 410 and 420 are fixedly secured to a mount box 430. The mount box 430 has a generally rectangular configuration sized and configured to slide over the skid steer loader push plate. The mount box 430 has a closed top 431, a pair of opposing vertical walls 432 (front wall), 433 (back wall), a pair of opposing sidewalls 434, 435, and an open bottom 436 to fit over the skid loader push plate. A cutout 437 is formed in the upper part of the mount box 430 to allow hydraulic hoses and control cables 181 to therethrough for connection to the actuator arms 220a, 220b.

A guiding plate 438 extends between the legs 410, 420 at the opening of the cutout 437 to protecting the hoses 181 and directing the hoses 181 downwardly. An alignment box 451 is secured on top of the mount leg 410, and a similar alignment box 452 is secured on top of the mount leg 420. A top plate 439 is secured between the alignment boxes 451 and 452. The alignment boxes 451 and 452 can be made of the same tubular material as the mount legs 410 and 420.

Fitted between the vertical wall of the mount leg 410 and the underside of the alignment box 451 is a pair of spaced apart brackets 440a and 440b. The brackets 440a and 440 are each provided with a through opening 441, 442 for receiving the securing rod 500 therethrough. A similar pair of brackets 440c and 440d is secured between the vertical wall of the mount leg 420 and the underside of the alignment box 452. The brackets 440c and 440d are each provided with a through opening 445, 446 for receiving the securing rod 500 therethrough. To operate the land clearing device 100, the universal mount assembly 400 is used to attach the land clearing device 100 to the loader or machine 120. The land clearing device 100 can also be permanently mounted on the loader 120. The operator raises the pusher assembly 200 and the grabber assembly 300 off the ground. To engage the locking arm 320 of the grabber assembly 300, the pusher assembly 200 should be retracted all the way toward the loader 120. If the pusher assembly 200 is not in a locked position, the mount assembly 400 is tilted until the pusher assembly 200 rests on top of the grabber assembly 300. The pusher assembly 200 is retracted until the pusher assembly 200 engages the locking arm 320.

Next, the mount assembly 400 is tilted towards the loader 120 to lessen the weight of the land clearing device 100 by bringing the land clearing device 100 closer to the loader 120. This will also shorten the total length of the loader 120 with the attached land clearing device 100. Thus, the loader 120 with the land clearing device 100 can easily weave in and around trees.

The land clearing device 100 is unlocked by extending the pusher assembly 200 about three inches. The grabber assembly 300 will then fall down to the ground. The grabber assembly 300 is then hooked around the trunk 140 of the tree 160 using the front hook 310. The pusher assembly 200 is tilted upward against the tree 160. The pusher assembly 200 is positioned higher along the trunk 140 of the tree 160 for harder wood with thicker diameter trunks, and lower on the tree 160 for smaller trees such as pine.

The pusher assembly 200 is extended using the actuator arms 220a and 220b until a root ball from the tree 160 is visible. This will occur when the tree 160 has been uprooted. The pusher assembly 200 is again extended to push the root ball off the end of the grabber assembly 300. A this point, the land clearing device 100 can be pulled back until the front hook 310 of the grabber assembly 300 rests in the stump hole. The land clearing deice 100 is then tilted up off the ground and only locked if the next tree is far away or if the land clearing is finished for the day.

With the three major components, the actuators 220a and 220b are connected to and controlled by the control unit 180 from the interior of the earthmoving machine 120. By using two hydraulic cylinders having 5.5-inch diameters, as the actuators 220a, 220b, a lateral pushing force can extend up to 47.1 tons on a tree trunk at a speed of 2.45 inch/sec when the flow is 3000 psi and twenty gallons/min. Thus, the pusher assembly 200 would be able to uproot an eighteen-inch diameter tree.

The machine 120 with this land clearing device 100 would weigh a fraction of the weight of an excavator or bulldozer. The land clearing device 100 could also do a selective job weaving in and around trees with relatively minimal ground impact. Leaving as many trees on building lots has become very popular. The prior building of housing developments by clear-cutting whole tracts of land is becoming unpopular. Thus, the land clearing device 100 of the present invention can assist the builders of new homes.

The tree service industry can utilize the land clearing device 100 of the present invention, particularly when the tree service people run into the problem of a tree that needs to be removed, while the tree is leaning towards a house, or power line. This is traditionally achieved by time consuming, expensive, and dangerous tree climbing. The vehicle-mounted land clearing device 100 could be placed between the structure and tree and positioned on the tree. Then a small wedge could be cut out of the tree slightly above the grabber hook 310 to prevent the stump from uprooting, and a second cut would be made on the opposite side. The cuts would be about ⅓ into the tree opposing each other. The pusher assembly 200 would push the leaning tree away from the structure until it snaps.

Trees that are located in a swampy area where heavy machinery would get stuck pose another obstacle. The Positrac skid-steer loader has wide rubber tracks that only exert 1.54 psi of ground force. This skid-steer loader has the universal bob-tack attachment mount. The small weight of the loader and the land clearing device 100 would enable land clearing in the swamp. It is also ideal for the logging industry.

In one of the preferred embodiments, the parts of the land clearing device are made mostly of one-quarter inch tubular steel. The main parts are made from eight-inch tubular steel and are one half inch thick. All other parts may be made solid. Both pins through the pin receiving holes may have an eighth of an inch clearance. There are simple caps on the end of the pins to keep them in place. Additionally, bolds fasten the caps through the center of the ends. The parts of the components 200, 300, and 400 can be welded for perfect alignment.

An economy version has also been contemplated that would be smaller, lighter, and half of the expense. The lets on component 200 would be eliminated and there would be one solid piece. Also there would be no hydraulics or hoses. Thus the elimination of these parts would reduce the cost of the economy version.

It is to be understood the present invention is not limited to the embodiment described above, but encompasses any and all embodiments within the scope of the following claims.

I claim:

1. A land clearing device, comprising:
    a pusher assembly having telescopically extendable actuator arms and a forward end configured to apply lateral pushing force to a trunk of a tree, said pusher assembly being supported by a pair of upright legs, said upright legs being configured to rest on the ground during operation of the land clearing device and being configured to support cantilevered pusher assembly;
    a grabber assembly mounted below the pusher assembly, said grabber assembly having a generally J-shaped front hook configured to partially encircle the trunk of the tree and support the tree at a location opposite a place of contact of the pusher arms; and
    a mounting assembly configured for detachable mounting on a front of an earthmoving machine, said mounting assembly being operationally connected to the pusher assembly and the grabber assembly by a common pivot rod.

2. The device of claim 1, further comprising a control unit adapted for operating the pusher arms from interior of the earthmoving machine.

3. The device of claim 1, wherein said pusher assembly comprises a pair of tubular front pusher arms each configured to telescopically receive a slidably movable actuator arm therein and a pair of tubular rear pusher arms configured to telescopically engage the front pusher arms.

4. The device of claim 3, wherein said pusher assembly further comprises a generally U-shaped contact member secured to the forward end of the pusher assembly, said contact member being configured to contact the trunk of the tree.

5. The device of claim 3, further comprising a transverse plate extending between lower portions of the upright legs and a pair of spaced-apart diagonal braces, each diagonal brace extending between the transverse plate and underside of one of the rear pusher arms.

6. The device of claim 3, wherein said pusher assembly further comprises a reinforcing member secured between the pusher arms.

7. The device of claim 6, wherein said reinforcing member has a generally inverted T-shaped configuration.

8. The device of claim 1, wherein the grabber assembly further comprises a generally Y-shaped yoke having upwardly turned rear portions, said upwardly turned rear portions being configured to pivotally engage the common pivot rod.

9. The device of claim 8, wherein said Y-shaped yoke is formed from tubular members.

10. The device of claim 8, wherein said Y-shaped yoke comprises a first boom unitary connected to the J-shaped front hook and a second boom extending at an acute angle to the first boom.

11. The device of claim 10, wherein a stop member is secured on top of the second boom, the stop member being configured to limit forward movement of the pusher assembly during operation.

12. The device of claim 10, wherein the grabber assembly further comprises a locking arm mounted between the first boom and the second boom, said locking arm having an upwardly turned proximate end configured for securing on the common pivot rod.

13. The apparatus of claim 1, wherein said mounting assembly comprises a mounting box configured for mounting on a front of the earthmoving machine, a pair of mount legs secured to a forward wall of the mounting box and mounting brackets secured to upper ends of the mount legs, said mounting brackets having openings therethrough configured for securing to the common pivot rod.

14. The device of claim 13, wherein said mounting box is provided with a cutout in an upper part thereof configured to allow control cables to extend from the control unit to the actuator arms.

15. A land clearing device, comprising:
    a pusher assembly having telescopically extendable actuator arms and a forward end configured to apply lateral pushing force to a trunk of a tree, said pusher assembly being supported by a pair of upright legs, said upright legs being configured to rest on the ground during operation of the land clearing device and being configured to support cantilevered pusher assembly, said pusher assembly further comprising a pair of tubular front pusher arms each configured to telescopically receive a slidably movable actuator arm therein and a pair of tubular rear pusher arms configured to telescopically engage the front pusher arms;
    a grabber assembly mounted below the pusher assembly, said grabber assembly having a generally J-shaped front hook configured to partially encircle the trunk of the tree and support the tree at a location opposite a place of contact of the pusher arms, said grabber assembly further comprising a generally Y-shaped yoke having upwardly turned rear portions, said upwardly turned rear portions being configured to pivotally engage the common pivot rod;
    a mounting assembly configured for detachable mounting on a front of an earthmoving machine, said mounting assembly being operationally connected to the pusher assembly and the grabber assembly by a common pivot rod, said mounting assembly comprising a mounting box configured for mounting on a front of the earthmoving machine, a pair of mount legs secured to a forward wall of the mounting box and mounting brackets secured to upper ends of the mount legs, said mounting brackets having openings therethrough configured for securing to the common pivot rod; and a control unit adapted for operating the actuator arms from interior of the earthmoving machine.

16. The device of claim 15, said pusher assembly further comprises a generally U-shaped contact member secured to the forward end of the pusher assembly, said contact member being configured to contact the trunk of the tree.

17. The device of claim 15, further comprising a transverse plate extending between lower portions of the upright legs and a pair of spaced-apart diagonal braces, each diagonal brace extending between the transverse plate and underside of one of the rear pusher arms.

18. The device of claim 15, wherein said pusher assembly further comprises a reinforcing member secured between the pusher arms, said reinforcing member having a generally inverted T-shaped configuration.

19. The device of claim 15, wherein said Y-shaped yoke comprises a first tubular boom unitary connected to the J-shaped front hook and a second tubular boom extending at an acute angle to the first boom.

20. The device of claim 19, wherein a stop member is secured on top of the second boom, the stop member being configured to limit forward movement of the pusher assembly during operation.

21. The device of claim 15, wherein said mounting box is provided with a cutout in an upper part thereof configured to allow control cables to extend from the control unit to the actuator arms.

* * * * *